G. S. SHUTE.

Electric and Thermostatic Fire-Alarm.

No. 8,075. Reissued Feb. 5, 1878.

Witnesses.

W. J. Pratt.

G. Wilson Gregory

Inventor.

George S. Shute by Crosby & Gregory

Attys

UNITED STATES PATENT OFFICE.

GEORGE S. SHUTE, OF BOSTON, MASSACHUSETTS.

IMPROVEMENT IN ELECTRIC AND THERMOSTATIC FIRE-ALARMS.

Specification forming part of Letters Patent No. 150,090, dated April 21, 1874; Reissue No. 8,075, dated February 5, 1878; application filed December 27, 1877.

*To all whom it may concern:*

Be it known that I, GEORGE S. SHUTE, of Boston, in the county of Suffolk and State of Massachusetts, have invented a certain new and useful Fire-Alarm, of which the following is a specification:

My invention consists in the combination, in a fire-alarm instrument, of insulated springs, each constructed of metals of different degrees of expansibility, arranged in electric circuit with an alarm, with connecting devices between the springs, whereby one spring moved more than the other by heat operates such devices to make a metallic connection between itself and the other spring, to throw into action an electric alarm, the springs under gradual or ordinary changes of temperature moving together and not closing the circuit; also, in a fire-alarm instrument, the combination, with thermal bars, of a case divided into two apartments, one for each bar, one apartment being more exposed than the other to the atmosphere, whereby the bar in the more exposed apartment at sudden or great changes of heat will be moved more than the other bar in the least exposed apartment, and will thereby operate devices to form a metallic connection between the two bars, and set in action an electric alarm in circuit with the bars.

Figure 1:
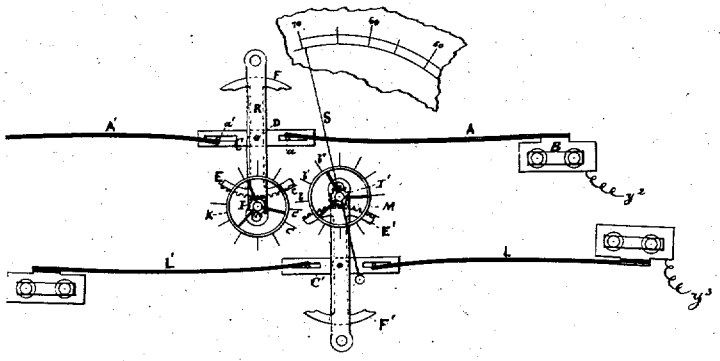
Figure 2:
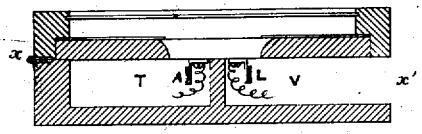

Figure 1 represents, in plan, the moving parts of my invention; and Fig. 2 is a section, showing the arrangement of the case in which the devices are held.

Let A and A′ represent thermal bars, made in the well-known manner, by uniting two strips of metal side by side, the metals having different constants of expansion. These bars are attached at their outer ends to the case by means of any suitable device, as B, for instance, Fig. 1. The inner ends of these bars A and A′ are provided with pins *a a′*, which pass through slots made in the cross-arm C, Fig. 1, hung on a pivot, D, which pivot has attached to it an arm, R, represented by dotted lines, which has at one of its ends a segment-gear, E, and at its other end a balance, F. The segment-gear E acts upon a pinion, I, which is attached to the wheel K, having spurs *c c′*, &c.

The metals in the thermal bars A and A′ are so arranged that in case of expansion or contraction by heat the bars act in concert to give motion to the cross-arm C, and through it the arm R, segment E, and wheel K.

The thermal bars L and L′ are arranged and supplied with an arm, C, a segment-gear, E′, balance F′, pinion I′, like those described above, and with a wheel, M, having spurs *b b′*, &c.

The bars L and L′ are made lighter than the bars A and A′, so that they will be more sensitive to a sudden change of temperature.

I attach to one of the wheels K or M a pointing-hand, S, which, moving over a graduated arc, will indicate the sensible temperature. The projecting spurs *b b′* and *c c′* are placed at equal spaces around the wheels K M, and so placed with relation the one to the other that at ordinary temperature of the atmosphere the spur of one wheel, *b′*, for instance, will be between two spurs, *c c′*, of the wheel K, touching neither, so that if both wheels revolve equally the spurs of one will not touch the spurs of the other; but in case one wheel revolves faster than the other, then the spurs of one wheel will come in contact with the spurs of the other, and thus start the electric alarm.

The case *x* is arranged as shown in Fig. 2, with an inclosed apartment, T, in which the thermal bars A A′ are placed; but the other apartment, V, is open to the air at *x′*, so that in case of fire the rods L L′ will be first exposed to heat, and, by expanding more rapidly than the rods or bars A A′, will cause the spurs of the wheel K to overtake the spurs of the wheel M, and thus make the connection necessary to give the electric alarm through circuit-wires $y^2$ $y^3$.

This instrument can be made very sensitive, and yet move with firmness when acted upon by the least variation of temperature.

The thermal bars act in the capacity of steadying-springs as well as thermostats.

The main thermal bars A L are assisted in operating the connecting devices by means of the auxiliary bars A′ L′.

I claim—

1. In a fire-alarm instrument, insulated thermal bars constructed of metals of different degrees of expansibility, and connecting devices, whereby a circuit may be completed between them, one of such bars being placed in a case or apartment, while the other bar is left more exposed, in order that in case of fire the exposed bar will be the first to feel the heat or sudden change of temperature, which will cause it to expand quicker than the inclosed bar, and thus operate the connecting devices to make a metallic connection between the inclosed and more exposed bar, to throw into action an electric alarm, the bars under gradual or ordinary changes of temperature moving together substantially alike without closing the circuit.

2. In a fire-alarm instrument, the combination, with thermal bars, of a case divided to form two apartments, one for each bar, one apartment being more exposed to the atmosphere than the other, whereby the bar in the more exposed apartment at sudden or great changes of heat or temperature will be moved more than the other bar in the least exposed apartment, and will thereby operate devices to form a metallic connection between the two bars in the different apartments, and set in action an electric alarm in circuit with the bars, substantially as described.

3. A thermostatic fire-alarm case divided into two apartments, one of which is more open to the action of the atmosphere than the other, whereby one apartment in a given time may receive a greater amount of heat than the other, to operate thermal bars in such apartments, one more rapidly than the other.

4. The combination of the thermal bar A, the cross-head C, and the thermal bar A′, all arranged to operate together, substantially as described, and for the purpose set forth.

5. The combination of the thermostat A A′, the circuit-closer *b b′ c c′*, and the thermostat L L′, one series of the thermostats being placed in an inclosed and the other in an exposed space, all operating together, substantially as described, and for the purpose set forth.

GEORGE S. SHUTE.

Witnesses:
GEO. W. GREGORY.
W. J. PRATT.